(12) United States Patent
Musumeci et al.

(10) Patent No.: US 8,427,008 B2
(45) Date of Patent: Apr. 23, 2013

(54) ELECTRONIC POWER SUPPLY CIRCUIT

(75) Inventors: Salvatore Rosario Musumeci, Catania (IT); Maria Francesca Seminara, Catania (IT); Marianna Sanza, Siracusa (IT); Patrizia Milazzo, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 648 days.

(21) Appl. No.: 12/643,810

(22) Filed: Dec. 21, 2009

(65) Prior Publication Data
US 2010/0159999 A1  Jun. 24, 2010

(30) Foreign Application Priority Data
Dec. 22, 2008  (IT) .............................. BS2008A0235

(51) Int. Cl.
*H02J 1/00* (2006.01)
*H02L 3/14* (2006.01)
(52) U.S. Cl.
USPC ........................................................... 307/31
(58) Field of Classification Search .................... 307/31, 307/36, 42, 107; 315/185 R
See application file for complete search history.

(56) References Cited

U.S. PATENT DOCUMENTS

| 8,035,315 | B2* | 10/2011 | Zhao et al. ................... 315/299 |
| 2006/0033482 | A1* | 2/2006 | Florence et al. ............... 323/267 |
| 2007/0120506 | A1* | 5/2007 | Grant ............................ 315/312 |
| 2008/0157687 | A1 | 7/2008 | Lin |
| 2009/0302776 | A1* | 12/2009 | Szczeszynski ............... 315/246 |

FOREIGN PATENT DOCUMENTS

| EP | 1 624 560 A1 | 2/2006 |
| WO | 2007/035883 A2 | 3/2007 |
| WO | 2008/017467 A1 | 2/2008 |
| WO | 2008/102479 A1 | 8/2008 |

* cited by examiner

*Primary Examiner* — Carlos Amaya
(74) *Attorney, Agent, or Firm* — Seed IP Law Group PLLC

(57) ABSTRACT

An electronic power supply circuit for a load composed of at least two independent circuit branches connected in parallel to each other, where a first branch requires a different power supply voltage from the power supply voltage of a second branch. The circuit includes a step-up converter, a timer circuit connected to the step-up converter so that the converter generates, alternately, at least a first output voltage able to power the first circuit branch and a second output voltage able to power a second circuit branch, a regulation circuit able to regulate the overvoltages at the ends of an output capacitor of the converter during commutations between the different output voltages; and a commutation circuit able to activate the step-up converter, according to the timer signals coming from the timer circuit, when the output voltage at the ends of the output capacitor has reached the level needed to power the activated branch and regulate the current flowing thereto.

16 Claims, 9 Drawing Sheets

ELECTRONIC POWER SUPPLY CIRCUIT

BACKGROUND

1. Technical Field

The present disclosure relates to an electronic power supply circuit of a load composed of at least two independent circuit branches connected in parallel to each other, and in particular where a first branch may require a different power supply voltage from the second circuit branch. The proposed power supply circuit is particularly suitable for driving LEDs, for example white light LEDs for back-lighting.

2. Description of the Related Art

White-light LEDs are the most widely used components for the back-lighting of mobile phones. The back-lighting of screens and keypads requires an increasingly intense white light to ensure the high quality of multimedia applications, for example in mobile phones.

Such applications require extremely accurate control of the conduction current of the LEDs so as to obtain a clean, clear light and high light intensity with the minimum number of external components for the control of the LEDs.

The precision of current control requires technical solutions based on serial connection of the LEDs. To power the LEDs connected in series, an architecture based on a DC-DC converter (also known as a "switched-mode power supply", SMPS) of the Step-Up type is used.

To reduce the number of external components, the SMPS are adapted to the specific application so as to have a single output and several feedback inputs, one for each circuit branch regardless of the LEDs being controlled.

However, the known architectures are not free of flaws. Specifically, current architectures based on SMPS step-up with voltage or current control, used to regulate the load current, do not permit optimized performance.

Some embodiments of such circuit architectures according to the known art will now be described.

FIG. 1 shows an embodiment solution with output voltage control. The dotted block shows the converter step-up circuit (SMPS). A voltage divider (R1, R2) is used to define the output voltage of the converter powering the two branches of LEDs connected in parallel. In order to control the current of each branch, a resistor (R) is added in series with the LEDs. The resistor sets the current that must circulate in each branch. However, the value of the current is not predictable, in that it depends on the voltage output and on the number "n" of LED diodes present in each branch. The value of the resistor R is set by:

$$R = (V_{out} - nV_{led})/I_{led}$$

where $I_{led}$ is the current flowing in each branch.

The difference in $V_{led}$ voltage depends on the conduction current of the diode and on the tolerance of the technological production process. For this reason, the correct value of the resistor R must be chosen case by case, so as to compensate the maximum voltage variations.

The output voltage is a design parameter and is set a priori to power each branch. The designer must consider the worst case of possible differences between the LEDs so as to ensure the necessary output voltage level $V_{out}$ to light the LEDs. This means oversizing the circuit and therefore not being able to optimize the architecture. Such situation clearly becomes even more critical in the presence of a different number of LEDs on each branch.

FIG. 2 shows an architecture with current control. In this case, maintaining the parallel connection between the branches of LEDs, the circuit no longer sets the output voltage. This is set by the number of LEDs connected in series. The current circulating in the branch closest to the converter (master branch) is used to close the feedback loop on the converter. The branch further away (slave branch) is not controlled by the loop; its current value may be set by regulating a resistor in series (R).

Such solution presents two drawbacks: the precision in controlling the current in the slave branch and control in the case of a different number of LEDs. In fact, the circuit controls the master branch only and has no return information from the other (slave) branch. The risk is that there may be no current flow in the LEDs not regulated directly. This situation could arise when the master branch has a lower number of LEDs than the other branch or when there are the same number of LEDs but the uncontrolled branch needs a higher power voltage than the regulated branch (on account of the tolerances of the LEDs mentioned above).

FIG. 3 shows another architecture, designed to resolve the problem of managing a different number of LEDs on two branches. In order to guarantee all the branches in parallel the voltage needed to light the LEDs, the use of a voltage control circuit is required. The required voltage is set by step-step regulation. The value of the resistor R2 is regulated (increased or decreased) depending on the $V_{out}$ voltage needed to guarantee the current in each branch. As a result, the output voltage $V_{out}$ is regulated dynamically so as to choose the correct value.

Even though this architecture seems to resolve the problems of this application, a drawback remains in any case. The limitation of this solution is that efficiency is not optimized in the case of a different number of LEDs in each branch. In fact, the branch with a lower number of LEDs regulates the current but could determine an excessive dissipation of power (regulating the current all the time).

FIG. 4a shows a different architecture with current control mode. In this case, more than one node is used for feedback control, one for each branch.

In this solution, a timer circuit is provided which generates for example two digital square wave synchronized signals outphased so that they are never at the logic level "1" at the same time (FIG. 4b). Such timer circuit instructs the converter to supply current at two loads in "time sharing", in other words alternately, even though such power alternation cannot be visually perceived by the user. The voltage output $V_{out}$ is set on the basis of the number of LEDs connected in series in each branch. In this case there is no master branch or slave branch. This solution therefore resolves the problem of precise control of the current in both branches. In fact, the voltage output $V_{out}$ is adapted alternately, depending on the timer signals, to the value requested by the regulation loop. The drawback of this solution however is the high level of overcurrent created in each branch during commutation. The peak current is particularly high in the case of different numbers of LEDs in each branch.

FIGS. 5a-5b show the diagrams of the timer signals of the voltage and of the output currents in the case of the circuit in FIG. 4a. In such diagrams $V_{out1}$ and $I_1$ indicate the voltage and the output current relative to the branch with four LEDs; $V_{out2}$ and $I_2$ indicate the voltage and output current relative to the branch with two LEDs. Clearly the output voltage $V_{out1}$ for the first branch must be greater than the output voltage $V_{out2}$ of the second branch, which has a lower number of LEDs.

FIG. 5b shows the same wave forms as FIG. 5a obtained using an oscilloscope.

The time required to pass from the output voltage Vout1 to the lower output voltage $V_{out2}$ depends on the value of the output capacity, on the value of the current $I_2$ circulating in the second branch and on the speed of the feedback loop.

As can be seen from FIGS. 5a and 5b, the current $I_2$ in the second branch initially shows a very high peak, due to the fact that the output capacity of the converter does not discharge immediately. In other words, during the transition and until the output capacity discharges, at the ends of the second branch there is a much higher power supply voltage than is needed to control the LEDs of the second branch.

The current peak constitutes a serious problem for the reliability of LEDs.

BRIEF SUMMARY

The present disclosure provides a circuit and method to devise and make available an electronic power supply circuit that makes it possible to overcome the drawbacks described above with reference to the known designs.

In accordance with one aspect of the present disclosure, a power supply circuit is provided that includes a step-up converter structured to convert a continuous input voltage into an amplified continuous output voltage to power the first and second circuit branches, the output voltage stored in an output capacitor connected in parallel to the first and second circuit branches to be powered; a timer circuit connected to the step-up converter so that the converter alternately generates at least one first output voltage to power the first circuit branch and a second output voltage to power a second circuit branch; a regulation circuit to regulate the overvoltages across the output capacitor during the commutations between the first and second output voltages; and a commutation circuit to activate, in accordance with the timer signals coming from the timer circuit, the step-up converter when the output voltage across the output capacitor has reached the level needed to power the activated branch and to regulate the current flowing therethrough.

In accordance with one embodiment, a power supply circuit is provided that includes a first circuit branch that requires a supply voltage that is different from a supply voltage of a second circuit branch; a voltage supply circuit to supply voltage alternatingly to the first and second circuit branches; a regulation circuit coupled in parallel to the first and second circuit branches and the voltage supply circuit and structured to prevent overvoltages during commutations of the supply voltage to the first and second circuit branches; and a commutation circuit coupled to the voltage supply circuit to activate the voltage supply circuit and to regulate current at the first and second circuit branches.

Ideally the power supply circuit includes an output capacitor coupled in parallel to the first and second circuit branches to receive, store, and output the supply voltage and to be regulated by the regulation circuit to prevent overvoltages across the output capacitor during commutations of the supply voltage from the voltage supply circuit. It can also include a timer circuit coupled to the voltage supply circuit to control alternating of the supply voltage.

In accordance with another aspect of the present disclosure, a mobile telephone is provided that includes a power supply circuit that comprises a first circuit branch that requires a supply voltage that is different from a supply voltage of a second circuit branch; a voltage supply circuit to supply voltage alternatingly to the first and second circuit branches; a regulation circuit coupled in parallel to the first and second circuit branches and the voltage supply circuit and structured to prevent overvoltages during commutations of the supply voltage to the first and second circuit branches; and a commutation circuit coupled to the voltage supply circuit to activate the voltage supply circuit and to regulate current at the first and second circuit branches.

BRIEF DESCRIPTION OF THE SEVERAL VIEWS OF THE DRAWINGS

Further characteristics and advantages of the power supply circuit according to the disclosure will be evident from the description below, made by way of a non-limiting example, of its preferred embodiments, with reference to the attached figures, wherein:

FIG. 4b shows the wave forms of two timer signals for alternate management of the loads in the power supply circuit of FIG. 4a;

FIG. 5a shows diagrams of the synchronization signals, voltages and output currents in the case of the circuit in FIG. 4a;

DETAILED DESCRIPTION

Figure 1:
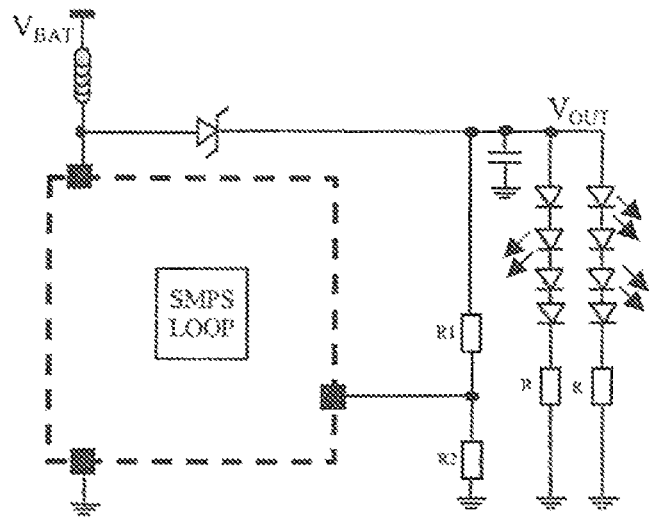
FIG. 1 shows a power supply circuit of two LED branches with control of the voltage, according to a prior design.
Figure 2:
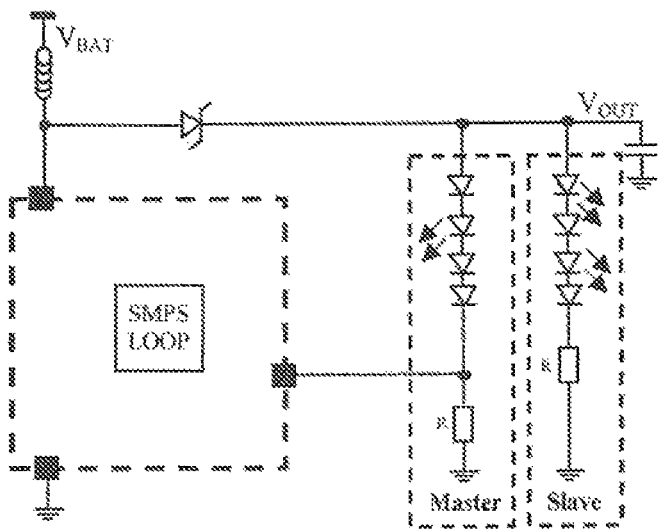
FIG. 2 shows a power supply circuit with current control, according to a prior design.
Figure 3:
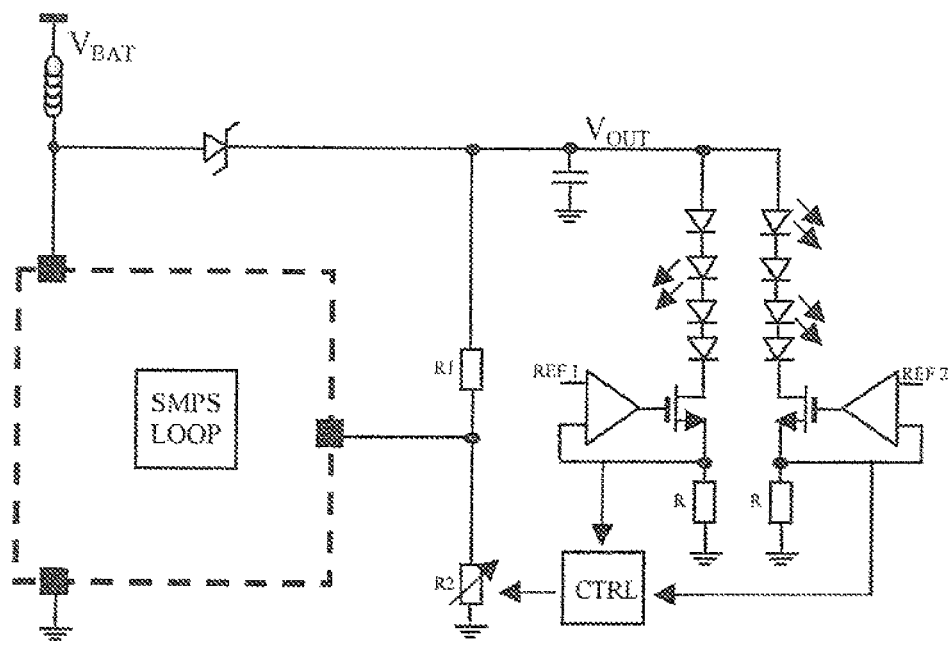
FIG. 3 shows a further embodiment variation of a power supply circuit according to a prior design, with voltage control and dynamic regulation of the output voltage.
Figure 4A:
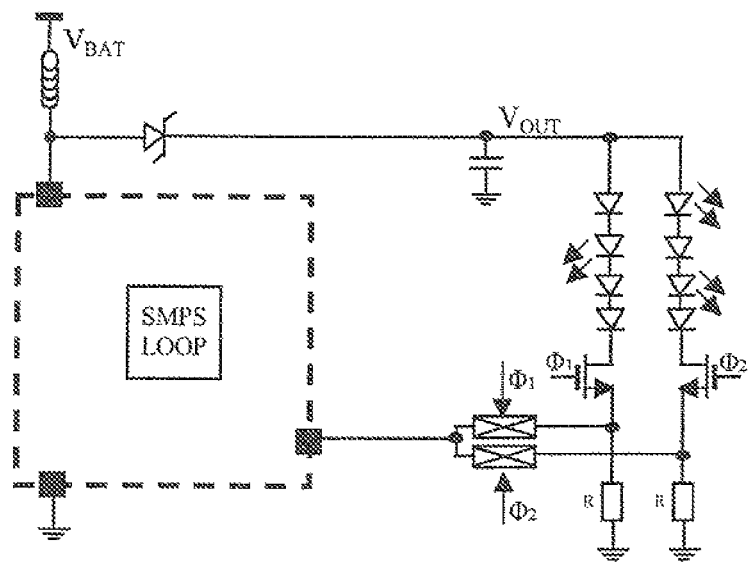
FIG. 4a shows a further embodiment variation of a power supply circuit according to a prior design, with current control and dynamic regulation of the output voltage.
Figure 4B:
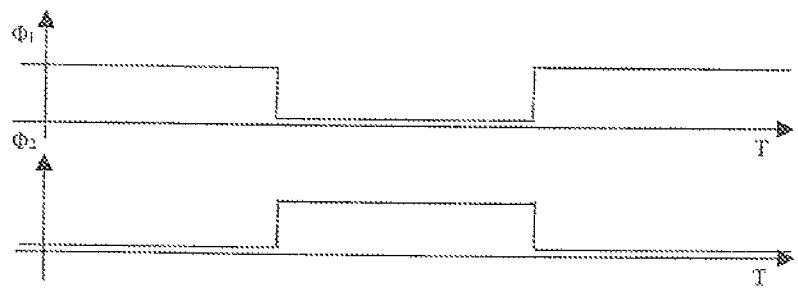
Figure 5A:
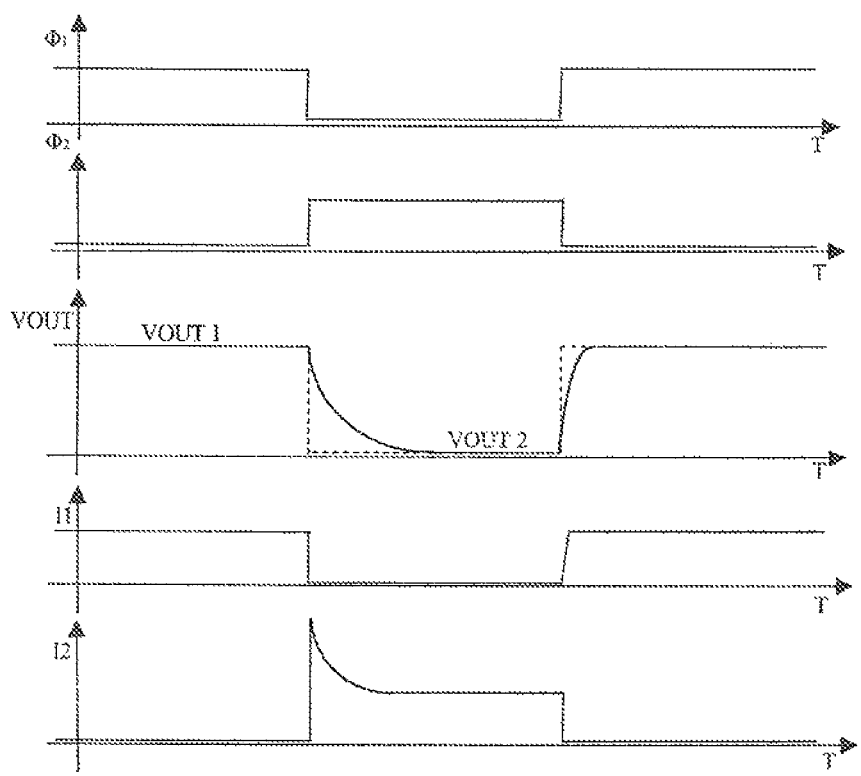
Figure 5B:
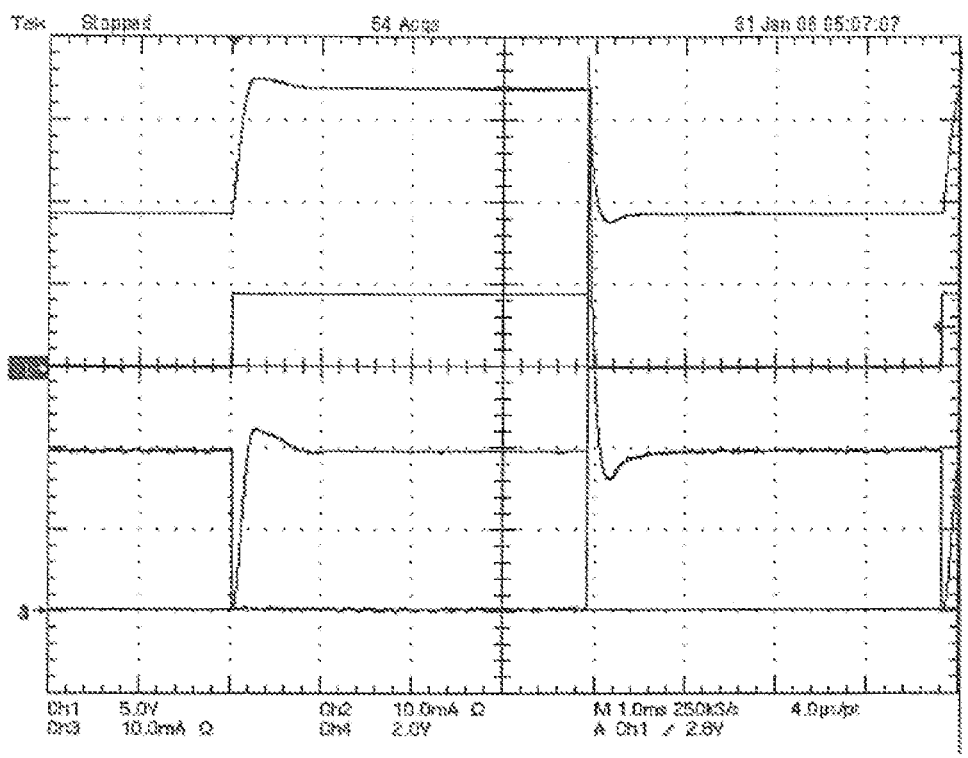
FIG. 5b shows the same wave forms as FIG. 5a, obtained using an oscilloscope.
Figure 6:
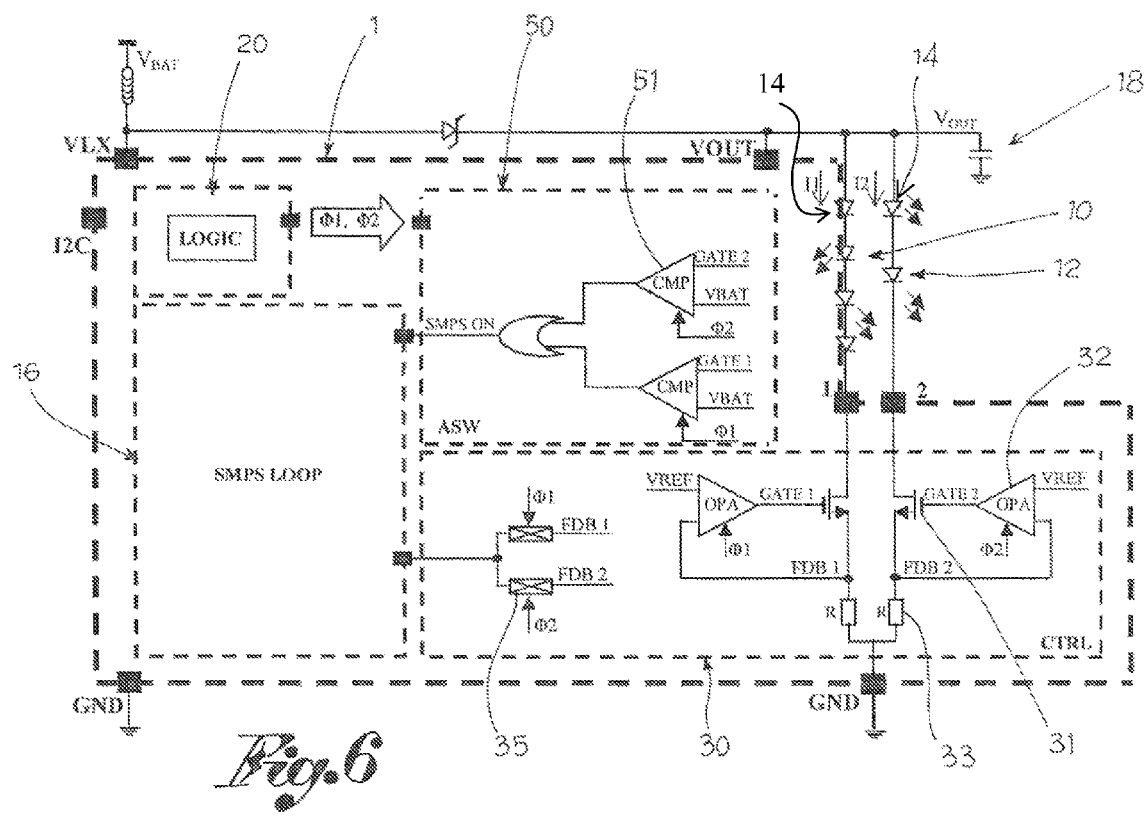
FIG. 6 shows a power supply circuit according to the present disclosure.

With reference to FIG. 6, reference numeral 1 globally denotes an electronic power supply circuit according to the present disclosure. The circuit 1 is particularly suitable for powering at least two circuit branches 10, 12 connected in parallel, where a first branch 10 may require a different power supply voltage $V_{out1}$ from the power supply voltage $V_{out2}$ of a second branch 12.

Advantageously, the power supply circuit 1 is able to power two branches of LEDs 14, such as white light LEDs for the back-lighting of screens or keypads, connected in output to the power supply circuit and in parallel to each other, where the LEDs of each branch are connected in series. To light the LEDs, the circuit 1 must generate a voltage $V_{out}$ such as to enable the flow of a current output $I_1$ along the first branch 10 and of a current output $I_2$ along the second branch 12.

Suppose, for example and with reference to FIG. 6, that four LEDs 14 are connected in series on the first branch 10, and that two LEDs 14 are connected on the second branch 12. The power supply voltage $V_{out1}$ of the first branch of LEDs must therefore be greater than the power supply voltage $V_{out2}$ of the second branch of LEDs.

The power supply circuit 1 comprises a step-up converter 16 (shown for simplicity's sake in FIG. 6 as a functional block, inasmuch as already known), able to convert a continuous input voltage $V_{bat}$ into a continuous amplified output voltage $V_{out}$ able to power the circuit 10, 12.

The output voltage $V_{out}$ is stored in a output capacitor 18 connected in parallel to the branches to be powered.

The power supply circuit 1 includes, in addition, a timer circuit 20 connected to the step-up converter 16 so that the converter alternately generates the first output voltage $V_{out1}$ able to power the first branch 10 of LEDs and the second output voltage $V_{out2}$ able to power the second branch of LEDs 12. In other words, the timer circuit 20 makes the converter 16 adapt the value of the output voltage to the branch which it is powering at the time.

According to one embodiment, the timer circuit 20 generates two digital signals $\Phi 1$ and $\Phi 2$ synchronized with each other, with the same frequency but opposite phases. Consequently the two branches of LEDs in parallel are never activated contemporaneously but alternately, that is in "time sharing" mode.

In other words, for a portion of the period of the digital timer signals, such as 50%, one branch is powered and, for the remaining period of time, the other branch is powered.

According to a preferred embodiment, the commutation frequency of the two signals $\Phi 1$ and $\Phi 2$ is such as to exploit the persistence of an image in the human eye to produce the light "average" of the LEDs. As a result, the human eye does not detect the alternate powering of the LEDs.

To such purpose the commutation frequency is typically more than 100 Hz. Consequently, assuming a sharing frequency of 100 Hz, each signal (and therefore each branch) is active for 10 msec.

The electronic power supply circuit 1 comprises, in addition, a regulation circuit 30 able to regulate the overvoltages at the ends of the output capacitor 18 during the commutations between the different output voltages $V_{out1}$ and $V_{out2}$. Specifically, as discussed above, during commutation from the four LED branch 10 to the two LED branches 12, and therefore from a $V_{out1}$ voltage to a $V_{out2}$ voltage, smaller than $V_{out1}$, the extra voltage at the ends of the output capacitor generate an extra current jeopardizing the reliability of the LEDs (the duration of the current peak is equal to the time taken by the condenser to discharge the extra voltage at its ends).

Above all, in this situation, the regulator circuit 30 regulates the output voltage until the output capacitor has discharged to the desired level. At this point the regulator circuit ceases to function and the correct power supply voltage $V_{out2}$ is supplied by the step-up converter 16.

To such purpose the power supply circuit 1 includes a commutation circuit 50 able to activate the step-up converter, in accordance with the timer signals, when the output voltage at the terminals of the output capacitor has reached the level needed to keep the two LEDs of the activated branch lit and regulate the current flowing thereto.

It should be noted that, according to a preferred embodiment, the values of the output voltages generated by the step-up converter are set depending on the number of LEDs on the branches and on the current flowing through each branch monitored via feedback control.

According to a preferred embodiment, the regulation circuit 30 comprises, on each branch of the device being powered, a power transistor 31, for example a MOSFET such as an NMOS, the gate of which is driven by an operational amplifier 32. This latter having on the positive input terminal a reference voltage (Vref) pre-set in relation to the current value desired in the corresponding branch. The negative input terminal of the operational amplifier measures the voltage value using a measurement resistor 33 which connects the branch to earth or ground. In other words, the negative input terminal of the operational amplifier 32 is at a voltage proportional to the current circulating in the relative branch, voltage measured across the measurement resistor 33.

In addition, each operational amplifier is controlled by an enabling signal that coincides with a respective timer signal $\Phi$.

In one embodiment, the information relative to the current circulating in the branches of the LEDs is sent to the converter in the form of a voltage signal measured across the measurement resistor 33. Advantageously, each of the voltage signals is connected to the converter by a respective selection circuit 35 activated by a respective timer signal $\Phi$.

According to one embodiment, the commutation circuit 50 includes an analogue circuit based on comparators 51. Each comparator 51, made for example with an operational amplifier, compares the gate signal present on the operational amplifier of the regulation circuit 30 with the input voltage $V_{bat}$ at the power supply circuit. When the values of such signals coincide, the comparator 51 activates the converter 16, and the circuit passes from the regulation mode, in which the converter 16 is not active, to the power supply mode via the step-up converter.

The functioning of the power supply circuit is as follows.

Consider first the condition of powering the first branch 10 of LEDs 14, with the power supply voltage $V_{out1}>V_{out2}$ given by the converter 16.

At the moment of commutation towards $V_{out2}$, the first timer signal $\Phi 1$ goes to zero disabling the respective operational amplifier. In this case, the gate signal in output from the amplifier goes to zero so that the relative MOSFET transistor comes to resemble an open circuit and current may therefore no longer flow along the first branch 10 of LEDs 14.

On account of the output capacitor of the converter, the power supply voltage does not instantly reach the $V_{out2}$ value but takes a certain amount of time to discharge to such value, sufficient for sustaining the two-LED branch. However the operational amplifier 32 on the second branch 12, activated by the respective timer signal, begins to work, making the voltage rise to the node gate of the respective NMOS until it achieves regulation, that is until the voltage on the negative terminal of the operational amplifier 32 reaches the reference voltage Vref. The NMOS driven by the signal on the respective gate sustains all the extra voltage caused by commutation from the four-LED branch 10 to the two-LED branch 12, until the $V_{out2}$ voltage reaches the desired value, thereby preventing extra current on the LEDs of such branch 12. As soon as the voltage at the terminals of the output capacitor fall to the desired $V_{out2}$ value, the operational amplifier 32 becomes unbalanced (the NMOS is no longer able to regulate the current flowing through the LEDs) and the signal on the gate begins to increase up to the $V_{bat}$ value corresponding to the input voltage to the power supply circuit 1. At this point the supply conditions of the regulator-converter are verified, in other words the commutation circuit 50 generates a signal activating the step-up converter 16. From this point onwards, until the next commutation of the synchronization signal, the power supply voltage $V_{out2}$ is set by the converter 16.

At the moment of commutation towards $V_{out1}$, the second timer signal $\Phi 2$ goes to zero, disabling the respective operational amplifier. This implies that the relative NMOS comes to resemble an open circuit, blocking the transit of current in the two-LED branch.

On account of the output capacitor of the converter, the power supply voltage does not instantly reach the $V_{out1}$ value, higher than $V_{out2}$. The operational amplifier on the first branch, activated by the respective timer signal, cuts in, making the voltage rise to the node gate of the respective NMOS. However in this case the regulator circuit 30 is unable to supply the required current, and the NMOS gate rises rapidly to the $V_{bat}$ value, triggering the converter 16. From this point onwards, until the next commutation of the timer signal, the power supply voltage $V_{out1}$ is set by the converter 16.

Figure 7A:
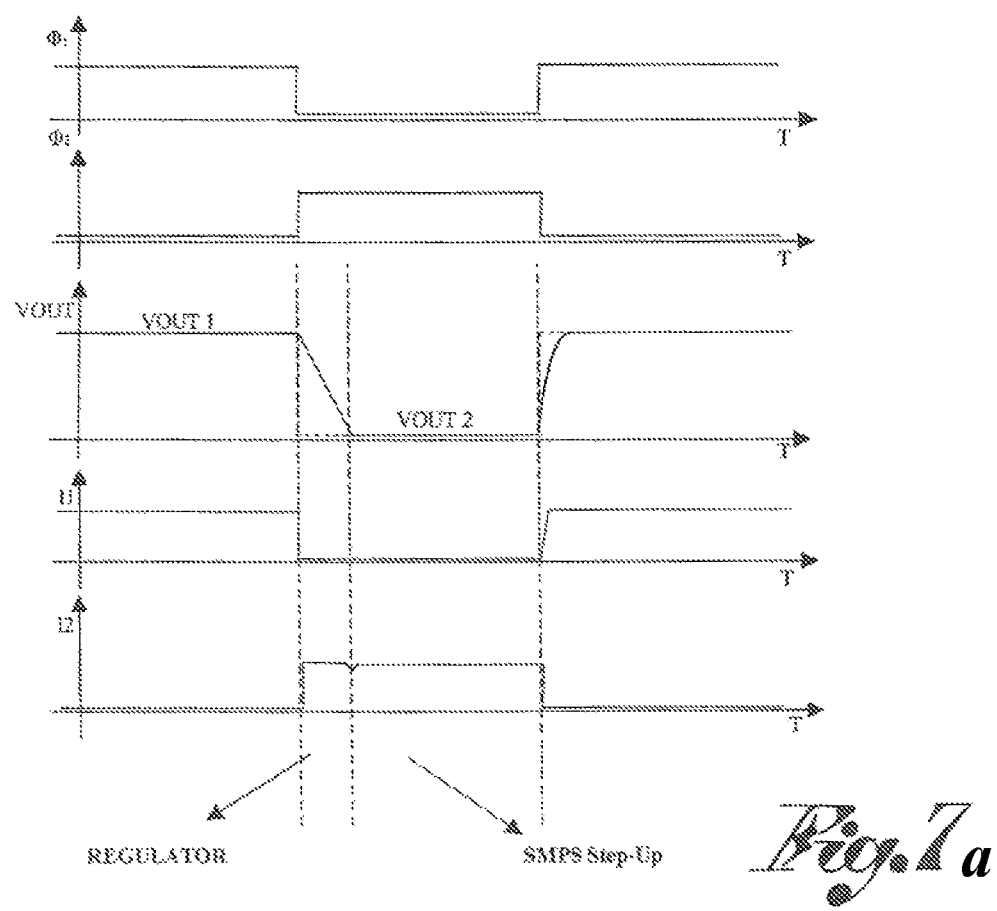
FIG. 7a shows diagrams of the synchronization signals, voltages and output currents in the case of the circuit according to the present disclosure.
Figure 7B:
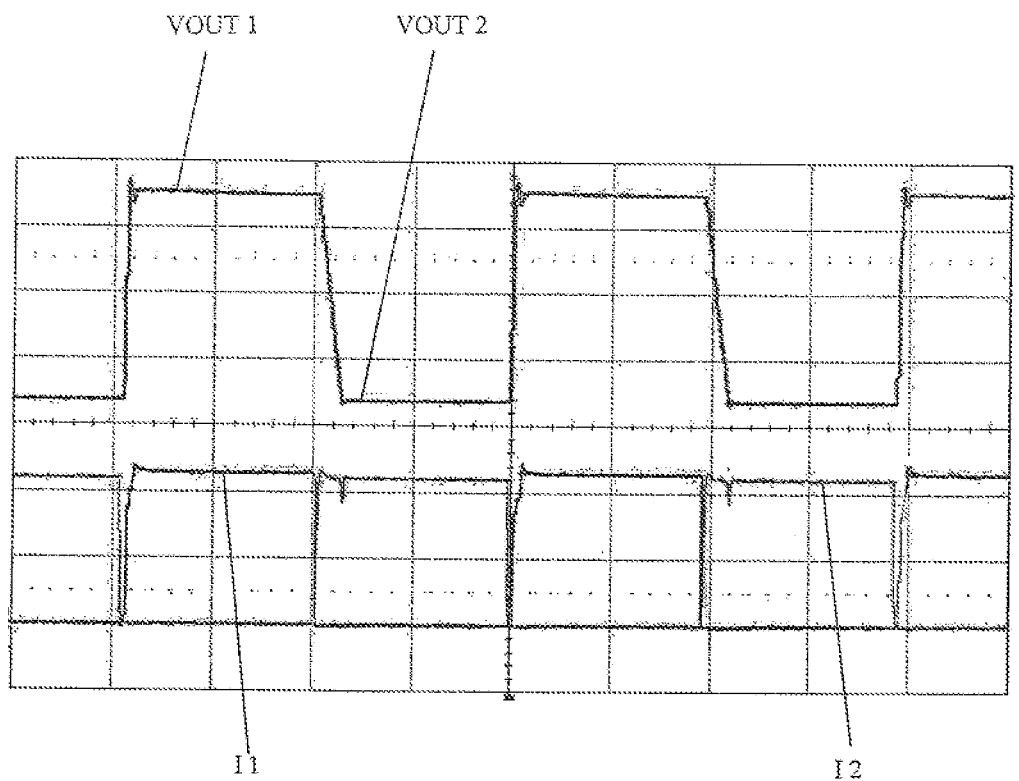
FIG. 7b shows the same wave forms as FIG. 7a, obtained using an oscilloscope.

FIGS. 7a and 7b show the waveforms of the output voltages $V_{out1}$ and $V_{out2}$ and of the output currents $I_1$ and $I_2$ with the power supply circuit 1 according to the present disclosure. As can be seen, there is no current peak, not even during transition from Vout1 to $V_{out2}$.

Figure 8:
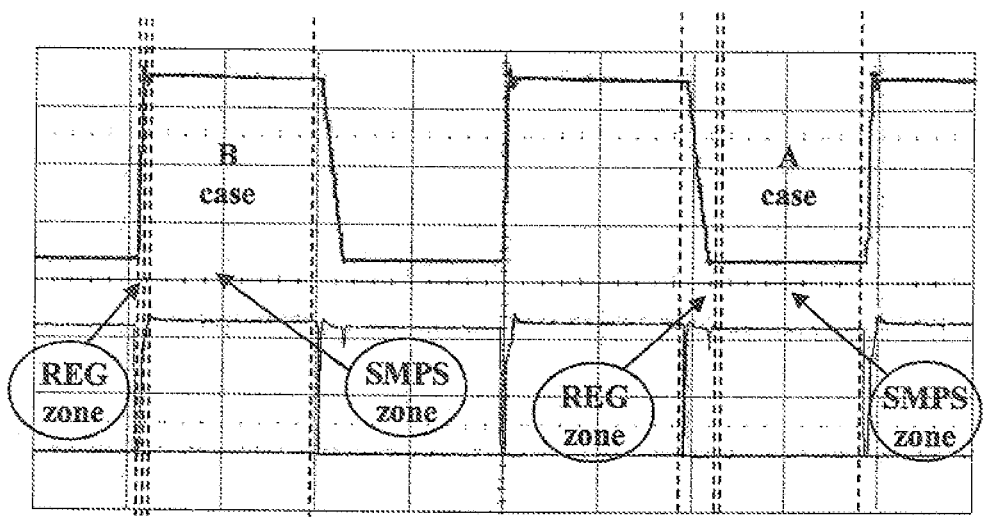
FIG. 8 is a representation of a similar wave form to FIG. 7b, in which the various functioning phases of the power supply circuit are highlighted.

In FIG. 8 it is possible to observe the various functioning phases of the power supply circuit 1. The alternation between functioning as a regulator (REG zone) and functioning as a step-up converter (SMPS zone) can be seen. Specifically, one may observe how regulation cuts in after a greater time interval in the case of passing from a higher voltage to a lower voltage.

It should be emphasized that the power supply circuit 1 described makes it possible to use a single coil step-up converter and single output capacitor.

The disclosure therefore makes it possible to create a power supply circuit based on a step-up converter 16, especially for powering white light LEDs 14, which prevents output overcurrents from arising, at the same time reducing the number of external components and thereby increasing performance. The only external components to be utilized are an inductor, a schottky diode and an output capacitor.

The hybrid step-up converter and regulator architecture powers independent branches in time-sharing.

According to an advantageous embodiment the converter 16, the regulator circuit 30 and the commutation circuit 50 are built into a single circuit, preferably an integrated circuit.

Advantageously, the current of each LED branch 10, 12 is controlled by a local feedback loop.

In order to reduce the dissipation of power and control the peak current, the output voltage is adapted, by the proposed hybrid structure, to the required voltage depending on the number of LEDs connected in series on each branch and on the current selected to flow through each branch.

Advantageously, the two functioning phases of the power supply circuit 1, as a regulator and as a converter, are automatically controlled by a dedicated commutation circuit 50.

It should be emphasized that the duration of the regulation is as short as possible in order to ensure maximum performance.

There are no master branches or slave branches, but each branch is independently controlled.

A person skilled in the art may make modifications, adaptations and replacements of elements with others functionally equivalent, to the embodiments of the power supply circuit described above so as to satisfy contingent requirements while remaining within the scope of protection of the following claims. Each of the features described as belonging to a possible embodiment may be realized independently of the other embodiments described.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic power supply circuit, comprising:
   a step-up converter structured to receive an input voltage and to convert the input voltage into first and second output voltages to power first and second circuit branches, respectively;
   a timer circuit coupled to the step-up converter and configured to generate timer signals configured to control the converter to alternately generate the first output voltage to power the first circuit branch and the second output voltage to power the second circuit branch;
   a regulation circuit configured to regulate overvoltages across an output capacitor during commutations between the first and second output voltages, the regulation circuit including:
      a first MOSFET transistor configured to electrically couple the first circuit branch to ground, the first MOSFET transistor having a gate;
      a second MOSFET transistor configured to electrically couple the second circuit branch to ground, the second MOSFET transistor having a gate;
      a first operational amplifier configured to provide a first gate signal to the gate of the first MOSFET transistor; and
      a second operational amplifier configured to provide a second gate signal to the gate of the second MOSFET transistor; and
   a commutation circuit configured to activate, in accordance with the timer signals from the timer circuit, the step-up converter, the commutation circuit including:
      a first comparator configured to compare the first gate signal with the input voltage and to provide a first activation signal to the step-up converter in response to the first gate signal reaching the input voltage; and
      a second comparator configured to compare the second gate signal with the input voltage and to provide a second activation signal to the step-up converter in response to the second gate signal reaching the input voltage.

2. The circuit according to claim 1 wherein the regulation circuit is configured to regulate the first and second output voltages by feedback control of current absorbed by each of the first and second circuit branches.

3. The circuit according to claim 1 wherein the step-up converter has a single coil and single output capacitor.

4. The circuit according to claim 1 wherein the regulation circuit includes:
   a first measurement resistor configured to electrically couple the first circuit branch to ground, the first operational amplifier having a first input terminal configured to receive a reference voltage and a second input terminal configured to receive a voltage across the first measurement resistor; and
   a second measurement resistor and configured to electrically couple the second circuit branch to ground, the second operational amplifier having a first input terminal configured to receive the reference voltage and a second input terminal configured to receive a voltage across the second measurement resistor.

5. The circuit according to claim 4 wherein the first measurement resistor is configured to provide a voltage proportional to a current through the first circuit branch and the second measurement resistor is configured to provide a voltage proportional to a current through the second circuit branch.

6. The circuit according to claim 1 wherein the timer circuit is configured to generate first and second timing signals and respectively control the first and second operational amplifiers with the first and second timing signals.

7. The circuit according to claim 1 wherein the timer circuit is configured to generate the timing signals as first and second digital signals that are synchronized with each other, have a same frequency, and have opposite phases.

8. The circuit according to claim 7 wherein the timer circuit is configured to control the first and second operational amplifiers with the first and second digital signals, respectively.

9. A circuit, comprising:
a first circuit branch and a second circuit branch coupled in parallel with the first circuit branch;
a voltage supply circuit configured to receive an input voltage and to generate a supply voltage alternatingly to the first and second circuit branches;
a regulation circuit coupled to the first and second circuit branches and the voltage supply circuit and structured to prevent overvoltages during commutations of the supply voltage to the first and second circuit branches, the regulation circuit including:
a first MOSFET transistor configured to electrically couple the first circuit branch to ground, the first MOSFET transistor having a gate;
a second MOSFET transistor configured to electrically couple the second circuit branch to ground, the second MOSFET transistor having a gate;
a first operational amplifier configured to provide a first gate signal to the gate of the first MOSFET transistor; and
a second operational amplifier configured to provide a second gate signal to the gate of the second MOSFET transistor; and
a commutation circuit coupled to the voltage supply circuit and configured to activate the voltage supply circuit and to regulate current at the first and second circuit branches, the commutation circuit including:
a first comparator configured to compare the first gate signal with the input voltage and to provide a first activation signal to the step-up converter in response to the first gate signal reaching the input voltage; and
a second comparator configured to compare the second gate signal with the input voltage and to provide a second activation signal to the step-up converter in response to the second gate signal reaching the input voltage.

10. The circuit of claim 9, comprising an output capacitor coupled in parallel to the first and second circuit branches and configured to receive, store, and output the supply voltage and to be regulated by the regulation circuit to prevent overvoltages across the output capacitor during commutations of the supply voltage from the voltage supply circuit.

11. The circuit of claim 10, comprising a timer circuit coupled to the voltage supply circuit and configured to control the voltage supply circuit to alternatingly generate the first supply voltage to the first circuit branch and the second supply voltage to the second circuit branch.

12. The circuit of claim 9 wherein the regulation circuit comprises, on each of the first and second circuit branches to be powered, a power transistor coupled in series with a measurement resistor and configured to couple the respective circuit branch to ground, the transistor having a gate configured to be driven by the output voltage of the an operational amplifier, the operational amplifier having a first input terminal configured to receive a pre-set reference voltage and a second input terminal configured to receive a voltage signal taken from across the measurement resistor.

13. A mobile telephone, comprising:
a power supply circuit that includes:
a first circuit branch configured to receive a first supply voltage and a second circuit branch configured to receive a second supply voltage that is different from a supply voltage of the first circuit branch;
a voltage supply circuit configured to receive an input voltage and to generate first and second supply voltages alternatingly to the first and second circuit branches;
a regulation circuit coupled in parallel to the first and second circuit branches and the voltage supply circuit and structured to prevent overvoltages during commutations of the supply voltage to the first and second circuit branches, the regulation circuit including:
a first operational amplifier coupled to the first circuit branch and configured to generate a first voltage signal; and
a second operational amplifier coupled to the second circuit branch and configured to generate a second voltage signal; and
a commutation circuit coupled to the voltage supply circuit and configured to activate the voltage supply circuit, the commutation circuit including:
a first comparator configured to compare the first voltage signal with the input voltage and to provide a first activation signal to the step-up converter in response to the first voltage signal reaching the input voltage; and
a second comparator configured to compare the second voltage signal with the input voltage and to provide a second activation signal to the step-up converter in response to the second voltage signal reaching the input voltage.

14. The circuit of claim 13, comprising an output capacitor coupled in parallel to the first and second circuit branches and configured to receive, store, and output the first and second supply voltages, and the regulation circuit configured prevent overvoltages across the output capacitor during commutations of the first and second supply voltages from the voltage supply circuit.

15. The circuit of claim 14, comprising a time circuit coupled to the voltage supply circuit and configured to generate timer signals configured to control the voltage supply circuit to alternately generate the first supply voltage to the first circuit branch and the second supply voltage to the second circuit branch.

16. The circuit of claim 13 wherein the regulation circuit comprises:
a first MOSFET transistor and a first measurement resistor series coupled and configured to electrically couple the first circuit branch to ground, the first MOSFET transistor having a gate;
a second MOSFET transistor and a second measurement resistor series coupled and configured to electrically couple the second circuit branch to ground, the second MOSFET transistor having a gate;
the first operational amplifier configured to provide the first voltage signal to the gate of the first MOSFET transistor, the first operational amplifier having a first input terminal configured to receive a reference voltage and a second input terminal configured to receive a voltage across the first measurement resistor; and the second operational amplifier configured to provide the second voltage signal to the gate of the second MOSFET transistor, the second operational amplifier having a first input terminal configured to receive a reference voltage and a second input terminal configured to receive a voltage across the first measurement resistor.

* * * * *